US009037553B2

(12) United States Patent  
Sanders

(10) Patent No.: US 9,037,553 B2  
(45) Date of Patent: May 19, 2015

(54) SYSTEM AND METHOD FOR EFFICIENT MAINTENANCE OF INDEXES FOR XML FILES

(75) Inventor: Daniel Sanders, Orem, UT (US)

(73) Assignee: NOVELL, INC., Provo, UT (US)

( * ) Notice: Subject to any disclaimer, the term of this patent is extended or adjusted under 35 U.S.C. 154(b) by 2316 days.

(21) Appl. No.: 11/376,896

(22) Filed: Mar. 16, 2006

(65) Prior Publication Data

US 2007/0220420 A1  Sep. 20, 2007

(51) Int. Cl.
- *G06F 7/00* (2006.01)
- *G06F 17/00* (2006.01)
- *G06F 17/30* (2006.01)

(52) U.S. Cl.
CPC ............................. *G06F 17/30923* (2013.01)

(58) Field of Classification Search
None
See application file for complete search history.

(56) References Cited

U.S. PATENT DOCUMENTS

| 6,804,677 B2 | 10/2004 | Shadmon et al. | |
|---|---|---|---|
| 2004/0103105 A1 | 5/2004 | Lindblad et al. | |
| 2005/0114314 A1* | 5/2005 | Fan et al. | 707/3 |
| 2005/0131895 A1* | 6/2005 | Harbarth et al. | 707/5 |

OTHER PUBLICATIONS

David Brownell, Referencing Multiple DTD in an XMI document, Nov. 2, 1999, http://mailman.ic.ac.uk/pipermail/xml-dev/1999-11/015894.html (Accessed: Jul. 6, 2009).*
Donald Knuth, The Art of Computer Programming, 1998, Addison-Wesley, vol. 3 2nd Ed., 482-485.*
Howe, The Free Online Dictionary of Computing, date unknown but at least 1996, http://foldoc.org/engine, http://foldoc.org/database.*
Unknown, The Authoritative Dictionary of IEEE Standards Terms, 2000, IEEE, 7th Ed, pp. 545-546.*
Unknown, Database Models: Hierarchical, Network, Relational, Object-Oriented, Semistructured, Associative, and Context, verified on Archive.org as of Jun. 18, 2004, unixspace.com, http://replay.web.archive.org/20040618225043/http://unixspace.com/context/databases.html.*
Refsnes Data, XML Tree verified on Archive.org as of Mar. 27, 2008, w3schools.com, http://replay.web.archive.org/20080327100859/http://www.w3schools.com/xml/xml_tree.asp?*

* cited by examiner

*Primary Examiner* — Jason Liao
(74) *Attorney, Agent, or Firm* — Haynes and Boone, LLP

(57) ABSTRACT

System and method for efficient maintenance of indexes for XML and other documents comprising semi-structured, hierarchical data are described. In one embodiment, the method comprises providing a first index definition document ("IDD") for defining a first index for the document, wherein the first IDD is applied to the document to create a first set of index keys for the document stored in the database and wherein the first IDD defines at least one set of relationships among nodes in the document; responsive to a change to the document affecting an update node thereof, performing a limited, localized traversal of the document around the update node to determine whether the change affects the first set of index keys; and updating the first set of index keys as necessitated by the change.

17 Claims, 10 Drawing Sheets

```
<xflaim:index name="CityStatePhoneIndex">
        <xflaim:ElementComponent name="Individual">
                <xflaim:ElementComponent name="HomeAddress">
                        <xflaim:ElementComponent name="State" KeyComponent="1">
                        <xflaim:ElementComponent name="City" KeyComponent="2">
                <//xflaim:ElementComponent>
                </xflaim:ElementComponent name="HomePhone" KeyComponent="3">
        </xflaim:ElementComponent>
</xflaim:index>
```
/40

Fig. 2

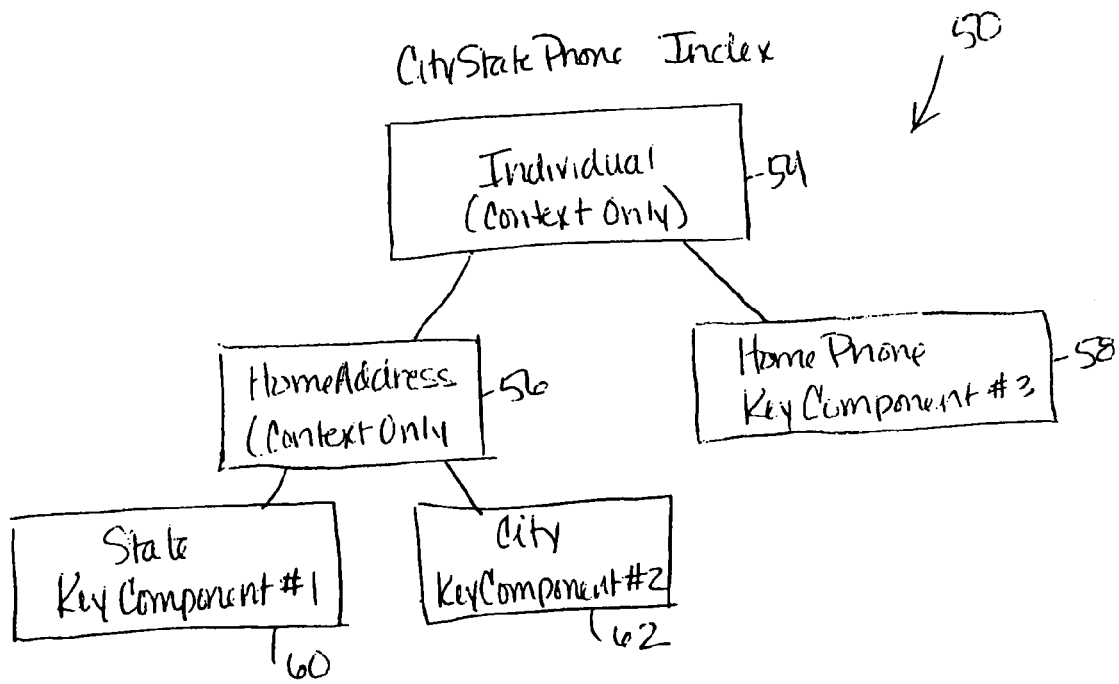

Fig. 3

```
<Individual>
    <HomeAddress>
        <City>Provo</City>
        <State>Utah</State>
    </HomeAddress>
    <HomeAddress>
        <City>SanFrancisco</City>
        <State>California</State>
        <HomePhone>911</HomePhone>
    </HomeAddress>
    <HomePhone>801-333-2222</HomePhone>
    <HomePhone>408-777-9999</HomePhone>
<Individual>
```
/96

Fig. 5

```
<Individual>
    <HomeAddress>
        <City>Provo</City>
        <State>Utah</State>
    </HomeAddress>
    <HomeAddress>
        <City>SanFrancisco</City>
        <State>California</State>
        <HomePhone>911</HomePhone>
    </HomeAddress>
    <HomePhone>801-333-2222</HomePhone>
    <HomePhone>408-777-9999</HomePhone>
    <EmergencyContact>Pete</EmergencyContact.>
<Individual>
```
/96

Fig. 7A

```
<Individual>
    <HomeAddress>
        <City>Orem</City>
        <State>Utah</State>
    </HomeAddress>
    <HomeAddress>
        <City>SanFrancisco</City>
        <State>California</State>
        <HomePhone>911</HomePhone>
    </HomeAddress>
    <HomePhone>801-333-2222</HomePhone>
    <HomePhone>408-777-9999</HomePhone>
<Individual>
```
96

Fig. 7B

```
<Individual>
    <HomeAddress>
        <City>Provo</City>
        <State>Utah</State>
    </HomeAddress>
    <HomeAddress>
        <City>SanFrancisco</City>
        <State>California</State>
    </HomeAddress>
    <HomePhone>801-333-2222</HomePhone>
    <HomePhone>408-777-9999</HomePhone>
<Individual>
```
96

Fig. 7C

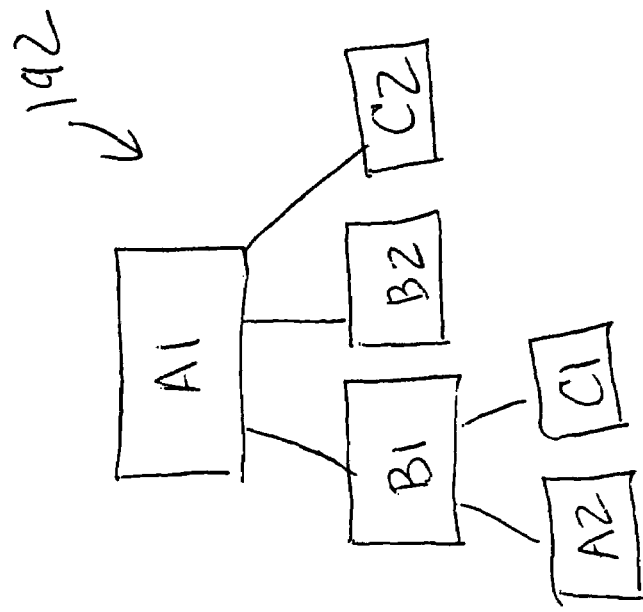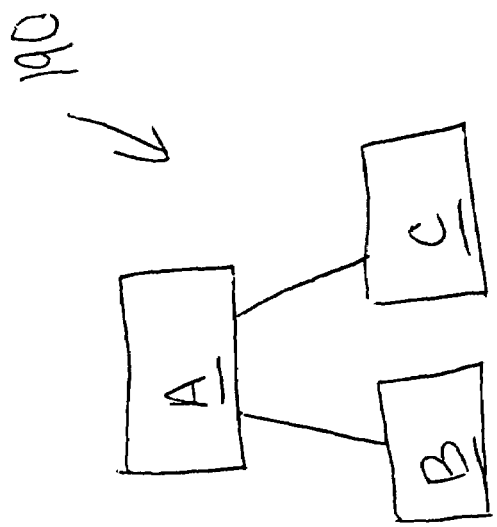
Fig. 10

SYSTEM AND METHOD FOR EFFICIENT MAINTENANCE OF INDEXES FOR XML FILES

CROSS-REFERENCE TO RELATED APPLICATION

This application is related to commonly-owned U.S. patent application Ser. No. 11/377,016, filed Mar. 16, 2006 entitled SYSTEM AND METHOD FOR PROVIDING SIMPLE AND COMPOUND INDEXES FOR XML FILES, filed on even date herewith and hereby incorporated by reference in its entirety.

BACKGROUND

Retrieving information from an XML data store can be costly in terms of both space and time. This is partially due to the fact that the semi-structured nature of XML does not lend itself to easy indexing. Additionally, maintaining indexes in an XML document can be difficult and time consuming. Most current XML databases have dealt with this problem by restricting the scope of the indexes, allowing only single attributes or single elements within an index. Others do not index XML as XML, instead forcing an internal conversion to a relational storage system to deal with the problem of indexing.

SUMMARY

In response to these and other problems, in one embodiment, a method is provided for efficiently managing indexes for XML and other documents comprising semi-structured, hierarchical data. The method documents. the method comprises providing a first index definition document ("IDD") for defining a first index for the document, wherein the first IDD is applied to the document to create a first set of index keys for the document stored in the database and wherein the first IDD defines at least one set of relationships among nodes in the document; responsive to a change to the document affecting an update node thereof, performing a limited, localized traversal of the document around the update node to determine whether the change affects the first set of index keys; and updating the first set of index keys as necessitated by the change

BRIEF DESCRIPTION OF THE DRAWINGS

FIG. 2 illustrates an index definition document in accordance with an embodiment.

FIG. 3 is a schematic diagram of an in-memory tree structure representing the index definition document of FIG. 2.

FIG. 5 illustrates an XML document to which the index definition document illustrated in FIG. 2 may be applied in accordance with an embodiment.

FIG. 7A illustrates the XML document of FIG. 5 subsequent to performance of an INSERT NODE operation thereon.

FIG. 7B illustrates the XML document of FIG. 5 subsequent to performance of a DELETE NODE operation thereon.

FIG. 7C illustrates the XML document of FIG. 5 subsequent to performance of an UPDATE NODE VALUE operation thereon.

FIG. 10 illustrates an index definition tree and affected XML document for use in illustrating the node combination process of FIG. 9B.

DETAILED DESCRIPTION

Figure 1:
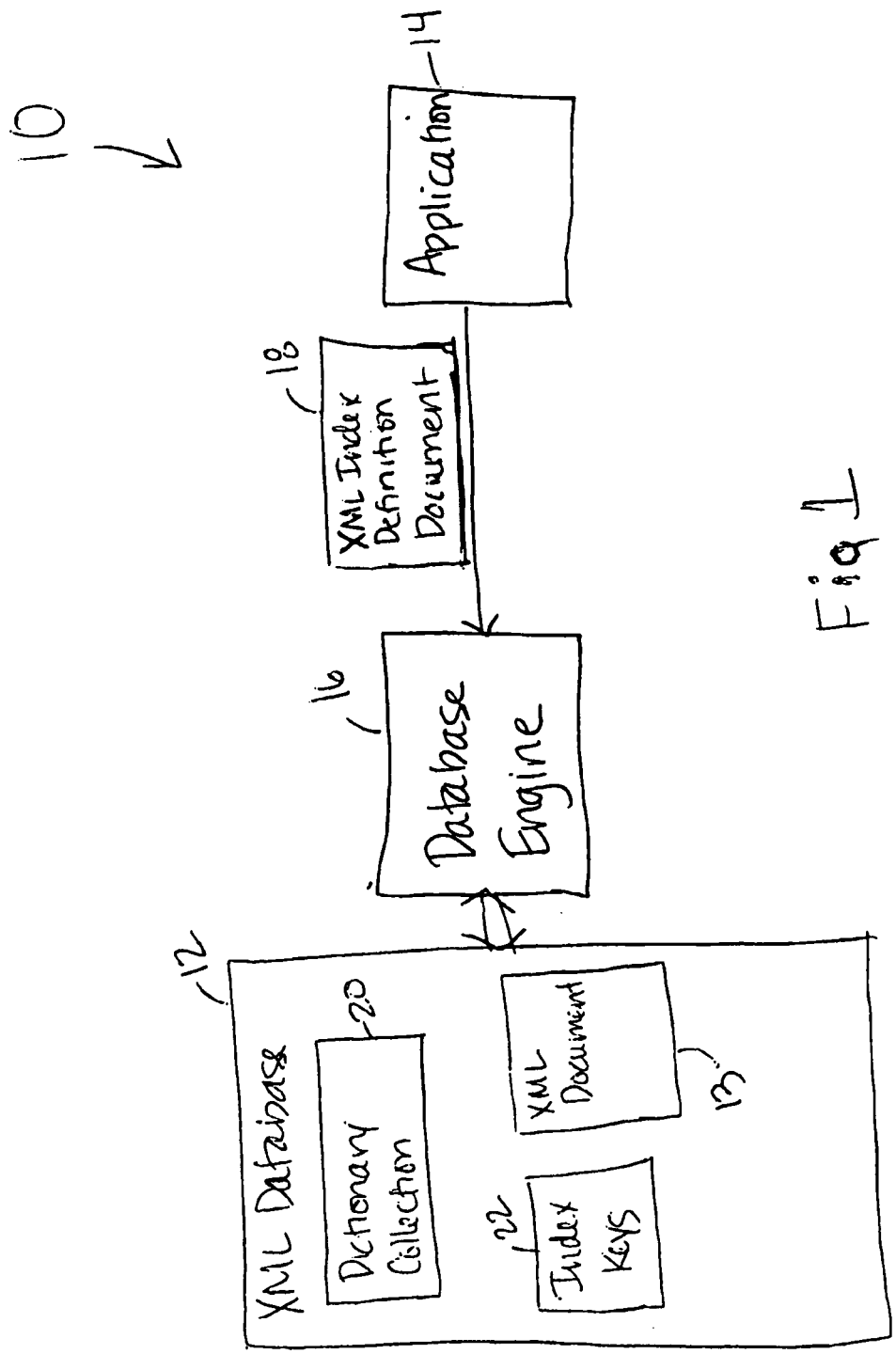
FIG. 1 is a block diagram of an XML database system in accordance with an embodiment.

This disclosure relates generally to XML documents and, more specifically, to a system and method for efficient maintenance of XML indexes. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a block diagram of an XML database system 10 according to an embodiment. As shown in FIG. 1, the system 10 includes an XML database 12 comprising a storage device in which at least one XML document 13 comprising data for one or more applications, such as an application 14, is stored. It will be recognized that the XML document 13 may actually comprise a collection of documents comprising application data for the application 14. An XML document, such as the XML document 13, is generally used to represent an object or a concept in the real world, such as a product, a customer, an employee, a business division, etc. As such, an XML document consists of a collection of nodes, such as, for example, ElementComponents or AttributeComponents, that represent information about the object. In XML, there is no requirement that the XML document 13 conform to a predefined template. In one embodiment, the XML database 12 supports the creation of arbitrarily structured documents. The creator of an arbitrarily structured document is not only allowed to determine the contents of the attributes within the document, but is also allowed to determine the structure of the document.

The system 10 further includes a database engine 16 for performing various operations on and in connection with data stored in the XML database 12, including the XML document 13. As will be described in greater detail hereinbelow, an XML index definition document ("XIDD") 18 is provided by the application 14 to the database engine 16. The database engine 16 stores the XIDD 18 in a dictionary collection 20 of the database 12 and generates a set of index keys 22 by applying the XIDD to the XML document 13. The index keys 22 point back to the nodes in the XML document 13 from which they were generated.

In one embodiment, the XML database 12 is a model based native XML database, such as Novell Corporation's XFLAIM database, for example. It will be recognized that, although portions of the embodiments described herein may be described with reference to the XFLAIM database, such descriptions are for the purposes of example only and that the embodiments described herein may be advantageously implemented using other types of XML databases as well.

Other details regarding simple and compound indexes are described in the aforementioned U.S. patent application Ser. No. 11/377,016, filed Mar. 16, 2006 entitled SYSTEM AND METHOD FOR PROVIDING SIMPLE AND COMPOUND INDEXES FOR XML FILES, which has been incorporated by reference in its entirety. For purposes of explanation herein, the existence of such simple and compound indexes over the XML database 12 will be assumed.

In accordance with an embodiment described herein, the database engine 16 generates for each XIDD, of which there may be many, an in-memory tree structure, referred to as an "index definition tree," that defines the elements and attributes that are to be indexed, including the context of each element and attribute with respect to one another. This is a simple tree structure that is generated by the database engine 16 and that is stored in the memory of a computer on which the database engine is running.

For example, FIG. 2 illustrates an XML document comprising an XIDD 40 designated "StateCityPhoneIndex". As illustrated in FIG. 3, an in-memory index definition tree 50 representing the XIDD 40. As best illustrated in FIG. 3, the XIDD 40 as represented by the index definition tree 50 defines a compound index consisting of two context-only components, including an Individual component 54 and a HomeAddress component 56, and three key components, including a HomePhone component 58 (KeyComponent=3), a State component 60 (KeyComponent=1), and a City component 62 (KeyComponent=2). As illustrated in both FIGS. 2 and 3, the HomeAddress component 56 and the HomePhone component 58 are siblings and are subordinate to the Individual component 54. The State component 60 and City component 62 are siblings and are subordinate to the HomeAddress component 56.

It will be recognized that, as previously noted, there will likely be many XIDDs and associated index definition trees stored in the database 12 at any given time.

Figure 4:
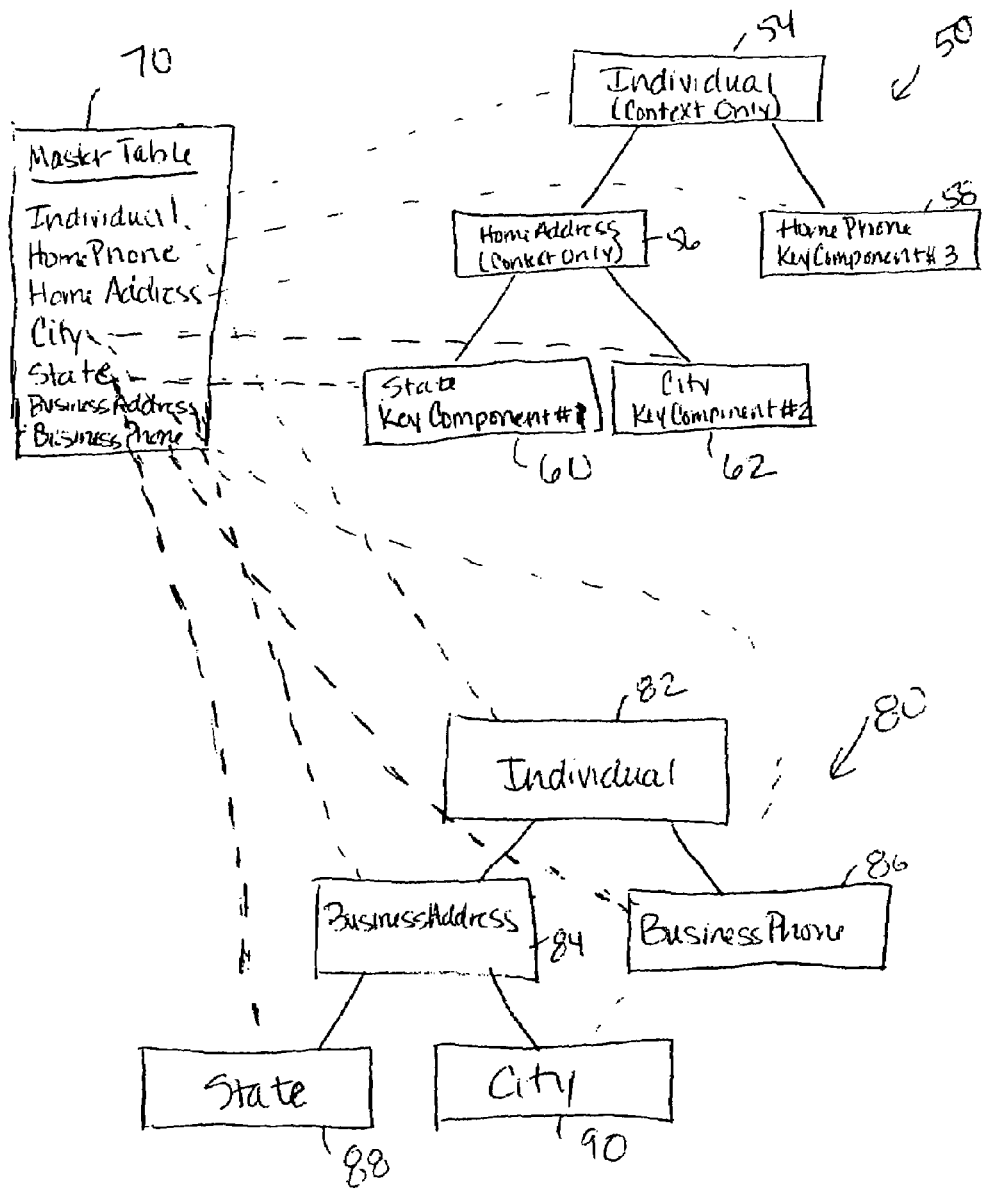
FIG. 4 is a schematic representation of the interaction between a Master Table and two in-memory tree structures representing index definition documents.

As shown in FIG. 4, in addition to the index definition tree 50 for the XIDD 40, also stored in the database 12 is a Master Table 70 that has an entry for every element or attribute in the XML database 12 that is involved in an index, such as the XIDD 40, in some way. Each entry in the Master Table 70 points to a node in one or more index definition trees, such as the index definition tree 50. As illustrated in FIG. 3, an "Individual" entry in the Master Table 70 points to an Individual node 54; a "HomePhone" entry in the Master Table 70 points to a HomePhone node 56; a "HomeAddress" entry in the Master Table 70 points to a HomeAddress node 58; a "State" entry in the Master Table 70 points to a State node 60 and a "City" entry in the Master Table 70 points to a City node 62.

If an element or attribute is included in multiple indexes, the nodes will be linked together. In this manner, it is possible to quickly find all of the usages of any given element or attribute in index definitions. To illustrate that point, a second index definition tree 80 is provided in FIG. 4. The second index definition tree 80 includes an Individual node 82, a BusinessAddress node 84, a BusinessPhone node 86, a State node 88, and a City node 90. It is not necessary for the purposes herein to designate which of the nodes 82-90 of the index definition tree 80 are "key components".

In addition to pointing to the Individual node 54, the Individual entry in the Master Table 70 also points to the Individual node 82. Similarly, in addition to pointing to the State node 60, the State entry in the Master Table 70 also points to the State node 88 and in addition to pointing to the City node 62, the City entry in the Master Table 70 also points to the City node 90. The Master Table 70 further includes a "BusinessAddress" entry that points to the BusinessAddress node 84 and a "BusinessPhone" entry that points to the BusinessPhone node 86.

For ease of example and clarity, the Master Table 70 includes only the nodes (i.e., elements and attributes) that are included in the indexes that correspond to index definition trees 50 and 80; in reality, the Master Table would include entries for other elements and attributes that point to nodes in other index definitions.

Figure 6:
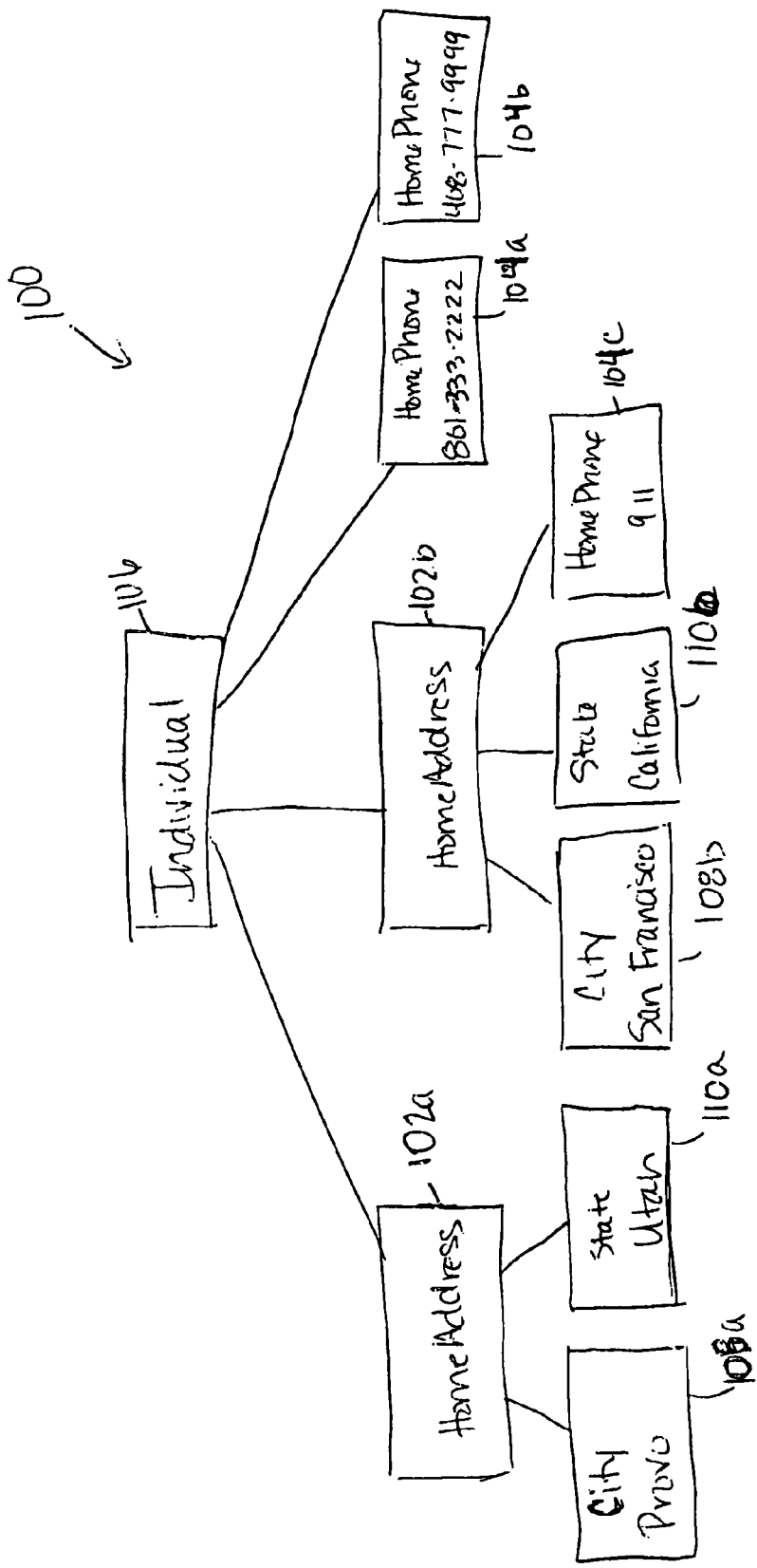
FIG. 6 is a schematic diagram of the XML document of FIG. 7.

FIG. 5 illustrates an XML document 96 such as might be stored in the XML database 12. FIG. 6 illustrates a tree structure 100 representing the XML document 95 shown in FIG. 5. As best illustrated in FIG. 6, the XML document 100 includes two HomeAddress elements 102a and 102b, and three HomePhone elements 104a-104c. The HomeAddress elements 102a and 102b and the HomePhone elements 104a and 104b are subordinate to an Individual element 106. The document 100 also includes two City elements 108a and 108b, and two State elements 110a and 110b. The City element 108a and the State element 110a are siblings and are subordinate to, or are children of, the HomeAddress element 102a. The City element 108b, the State element 100b, and the HomePhone element 104c are siblings and are subordinate to, or children of, the HomeAddress element 102b.

There are essentially three operations that can be used to update XML documents in an XML database. These include "INSERT NODE", "UPDATE NODE VALUE", and "DELETE NODE". As used herein, the term "update node" will refer to the node being inserted, updated, or deleted and the term "affected document" or "affected XML document" will refer to the XML document containing the update node. FIGS. 7A, 7B, and 7C respectively illustrate the XML document 96 (FIG. 5) after the performance of INSERT NODE, UPDATE NODE, and DELETE NODE operations thereon. Referring to FIG. 6, in the INSERT NODE case (FIG. 7A), the update node is an EmergencyContact element (not shown), which is subordinate to the Individual element 106 and a sibling to the HomeAddress elements 102a, 102b, and the HomePhone elements 104a, 104b. In the UPDATE NODE case (FIG. 7B), the update node is the City element 108a, the value of which has been changed from "Provo" to "Orem". In the DELETE NODE case (FIG. 7C), the update node is the HomePhone element 104c.

Figure 8:
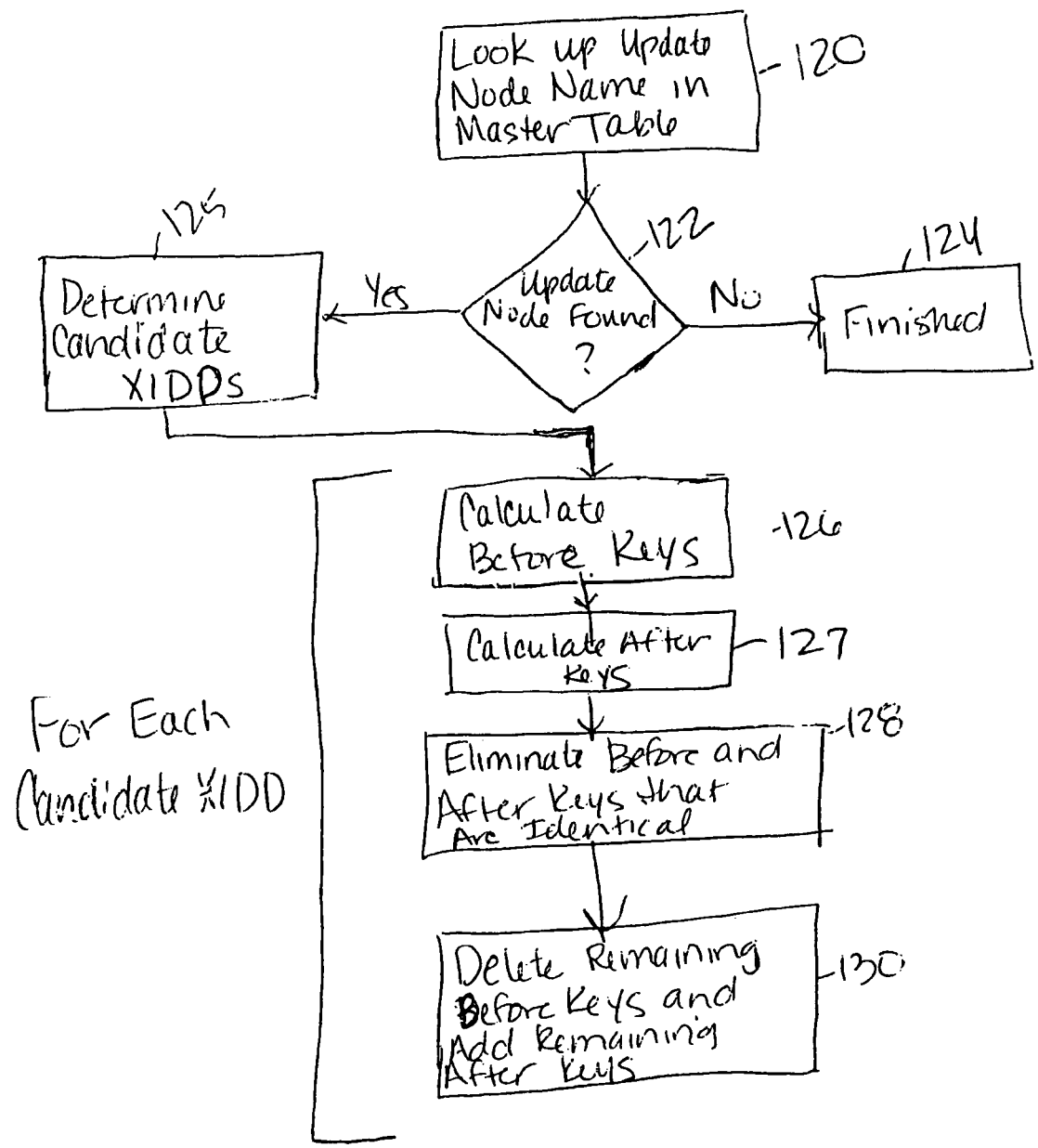
FIG. 8 is a flowchart of an index key set update process in accordance with one embodiment.

In one embodiment, one result of the performance of any of the aforementioned operations on an XML document stored in the database 12 is the triggering of an index key set update process performed by the database engine 16. An embodiment of the index key set update process is illustrated in FIG. 8. In step 120, the element or attribute name of the update node is looked up in the Master Table stored in the database 12, such as the Master Table 70, to determine whether there are any XIDDs that include that particular element or attribute name. It will be recognized that the Master Table may be implemented by any appropriate technique, such as using a hash table or a sorted array, for example, so long as the technique is fast. In step 122, a determination is made whether a corresponding entry is located in the Master Table. If there is no entry in the Master Table corresponding to the name of the update node, then the operation performed on the affected XML document does not affect any of the indexes and execution of the process terminates in step 124.

In contrast, if there is an entry in the Master Table corresponding to the name of the update node, in step 125, a determination is made as to the identity of each XIDD to which the corresponding Mater Table entry points (as described above with reference to FIGS. 2-4). Each of the XIDDs to which the corresponding Master Table entry points are referred to herein as a "candidate XIDD". The following steps 126-130 are then performed with respect to each of the candidate XIDDs. In step 126, a set of index keys that exist in the affected XML document prior to the update (hereinafter "Before Keys") are calculated. Similarly, in step 127, a set of index keys that will exist in the affected XML document after the update (hereinafter "After Keys") are calculated. The operations performed to accomplish steps 126 and 127 are described in greater detail below with reference to FIGS. 9A and 9B. In general, Before Keys will be deleted from the set of index keys for the document, while After Keys will be added to the set; however, before performing the deletion and/or insertion is performed, in step 128, checks are performed to determine whether any of the Before Keys are identical to any of the After Keys. If so, the identical keys effectively cancel each other out, so there is not need to perform the actual insertions/deletions in the index key set with respect to those keys. This step is performed to avoid unnecessary updates to the index key set. Before Keys and After Keys that are identical are eliminated from their respective groups. In step 130, the remaining Before Keys (i.e., those Before Keys that were not eliminated in step 128 are deleted from the set of index keys. Similarly, the remaining After Keys (i.e., those After Keys that were not eliminated in step 128) are added to the set of index keys.

Figure 9A:
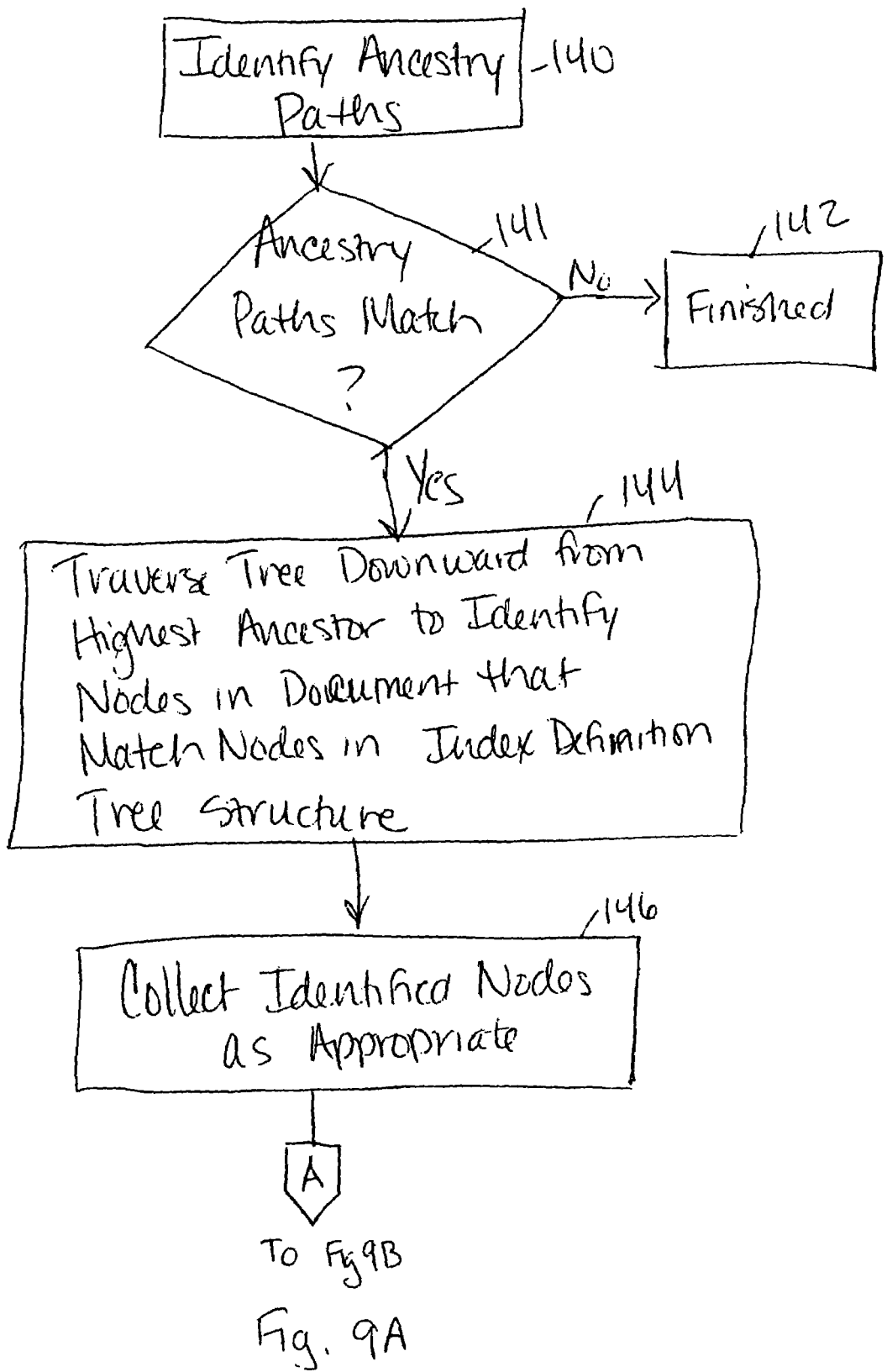
FIG. 9A is a flowchart a node collection process portion of the index key set update process of FIG. 8.

Calculating the groups of Before Keys and After Keys in steps 126 and 127 involves two primary steps, including (1) collecting the set of all relevant nodes in the XML document (the "node collection process"), that is, the set of all nodes in the XML document that are related as defined by the one or more of the candidate XIDDs, and (2) combining nodes that are correctly related into index keys (the "node combining process"). It will be recognized that both of these steps are performed in connection with calculating the Before Keys and again in connection with calculating the After Keys. In particular, the node collection process involves collecting An embodiment of a mechanism for carrying out the node collection process is illustrated in FIG. 9A. The mechanism illustrated in FIG. 9A determines a candidate set of nodes that can be combined into Before and After Keys without requiring a complete traversal of the affected document. Instead, a "local traversal" that is "anchored" around the update node and is driven by the index definition tree is performed in such a manner that only the nodes that are in specific relationships to the updated node (i.e., parent, grandparent, uncle, nephew, child, sibling, etc.), as specified by the index definition tree are collected.

As shown in FIG. 9A, in step 140, the respective ancestry paths of the update node and the node to which it corresponds in the index definition tree of the candidate XIDD under consideration are identified. In step 141, a determination is made whether the ancestry paths match. Specifically, the ancestors of the update node must be of the same type (i.e., element or attribute) and have the same name as the ancestors of the corresponding index definition tree node (i.e., the node pointed to by the entry of the Master Table). It will be noted that it is acceptable for the ancestry path of the update node to be longer than the ancestry path specified in the index definition. For example, if the ancestry path of the index definition node is "b/c" and the ancestry path of the update node is "a/b/c", the ancestries match. However, if the ancestry path of the index definition node is "a/b/c" and the ancestry path of the update node is "b/c", the ancestries do not match.

If it is determined that the ancestries do not match, execution terminates in step 142, as the change to the affected XML document does not affect the candidate XIDD currently under consideration; otherwise, execution proceeds to step 144. In step 144, beginning with the highest ancestor node in the index definition tree identified in step 140, both trees are simultaneously traversed downward to identify nodes in the document tree that match nodes in the index definition tree. An important aspect of this traversal is the notion of "anchor nodes" in the document. The chain of ancestor nodes in the document tree that match the ancestor path of the index definition tree nodes, including the update node, are considered to be "anchor nodes" in the document. When traversing the document, if there are two or more sibling nodes to an anchor node with the same name as the anchor node, those nodes are ignored during subsequent operations.

For example, referring to FIG. 6, assuming that the HomeAddress node 102a is the update node, the anchor nodes would be the Individual node 106, the City node 108a, and the State node 110a. As a result, when the document is traversed, the HomeAddress node 102b, the City node 108b, and the State node 110b will each be ignored as having the same name as an anchor node.

In step 146, the identified nodes are collected as appropriate for generating Before Keys and After Keys in the index. It should be noted that for the INSERT NODE and DELETE NODE operations, the generation of Before Keys and After Keys has a unique aspect. For an INSERT NODE operation, the generation of the Before Keys must proceed as if that the inserted node and its sub-tree are not yet present in the document. For a DELETE NODE operation, the generation of After Keys must proceed as if the node to be deleted and its sub-tree are not present in the document. Therefore, in performing step 146, if the node collection process illustrated in FIG. 9A is being used to generate Before Keys responsive to an INSERT NODE operation, the update node and the nodes of its subtree are not collected during that step. Similarly, if the node collection process is being used to generate After Keys responsive to a REMOVE NODE operation, the update node and the nodes of its subtree are not collected during the performance of step 146. Upon completion of step 146, execution proceeds step 150 (FIG. 9B).

Figure 9B:
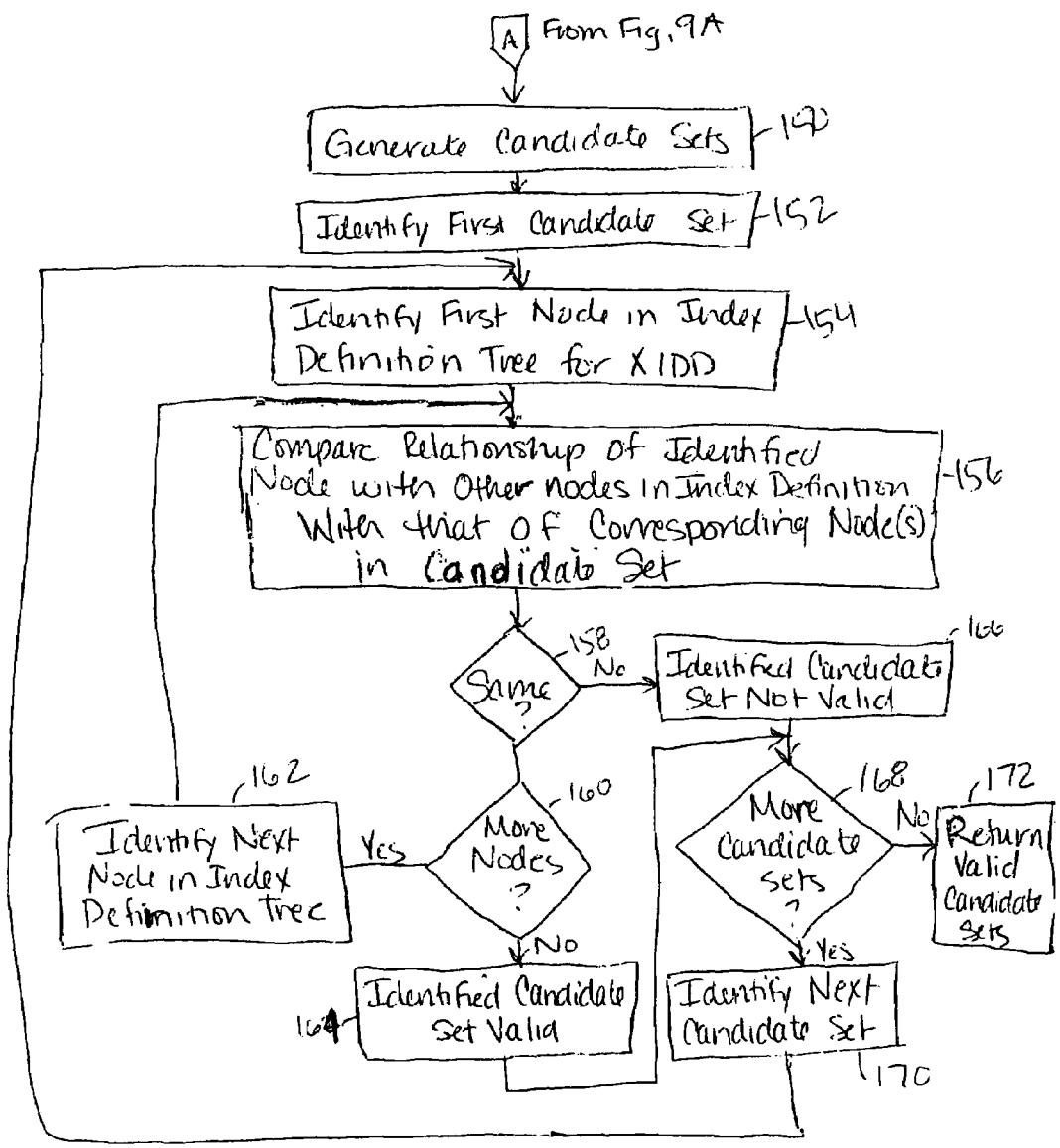
FIG. 9B is a flowchart node combination process portion of the index key set update process of FIG. 8.

An embodiment of a mechanism for carrying out the node combination process is illustrated in FIG. 9B. The mechanism illustrated in FIG. 9B determines which of the nodes collected during the node collection process (FIG. 9A) are correctly related so as to be combined into index keys. This step might appear redundant, given the fact that the only nodes that are collected are those that are correctly related to the update node, as defined by the candidate XIDDs; however, although all of the nodes collected step 144 (FIG. 9A) are correctly related to the update node, not all of them are necessarily correctly related to each other to produce index keys. Thus, in generating index keys, the relationships need to be verified. If it is assumed that a set of candidate nodes from the document correspond to each of the nodes in the index definition tree, verifying that the nodes are properly related is a straightforward process.

Referring to FIG. 9B, in step 150, candidate sets are generated from the nodes collected in the node collection process (FIG. 9A). The generation of candidate nodes will be discussed in greater detail with reference to FIG. 10. In step 152, first one of the candidate sets generated in step 150 is identified. In step 154, a first node of the index definition tree is identified. In step 156, the parent/child relationship of the identified node and any other relevant node in the index definition tree are compared with the parent/child relationship of the corresponding node(s) in the identified candidate set. Two situations will result in a positive determination in step 158:

1. if the identified node has a parent in the index definition tree, the corresponding node in the candidate set must also have a parent in the candidate set and that parent must correspond to the parent of the identified node in the index definition tree; and
2. if the identified node does not have a parent in the index definition tree, the corresponding node in the candidate set also must not have a parent in the identified candidate set.

If a positive determination is made in step 158, execution proceeds to step 160, in which a determination is made whether there are more nodes in the index definition tree to be considered. If so, execution proceeds to step 162, in which a next node in the index definition tree is identified, and then returns to step 156; otherwise, execution proceeds to step 164. In step 164, it is determined that the identified candidate set is valid. Conversely, if a negative determination is made in step 158, execution proceeds to step 166, in which it is determined that the identified candidate set is not valid. In either case, subsequent to a determination that the candidate set is valid (step 164) or invalid (step 166), execution proceeds to step 168, in which a determination is made whether there are more candidate sets to be evaluated. If so, execution proceeds to step 170, in which the next candidate set is identified, and then returns to step 154; otherwise, execution proceeds to step 172. In step 172, the valid candidate sets are deemed to comprise either the group of Before Keys (FIG. 8, step 126) or the group of After Keys (FIG. 8, step 127).

FIG. 10 illustrates the generation of candidate sets referred to in step 150 (FIG. 9B). As illustrated in FIG. 10, an index definition tree 190 includes three nodes, designated A, B, and C. As shown in FIG. 10, nodes B and C are siblings and are subordinate to node A. A document tree 192 corresponding to an affected XML document (not shown) includes six nodes, designated A1, A2, B1, B2, C1 and C2. As illustrated in FIG. 10, the nodes B1, B2, and C2 are siblings and are subordinate to the node A1. The nodes A2 and C1 are siblings and are subordinate to the node B1.

During the node collection process, for each node in the index definition tree, a list of nodes from the affected document that correspond to that node in the tree is maintained. This list could be implemented using something as simple as a linked list off each node in the definition tree. As a document node is collected, it is placed in the appropriate node list. Assuming that the update node is the node A1, for the node list corresponding to node A, there will be two nodes from the document tree: node A1 and node A2. Similarly, the node list for node B will include nodes B1 and B2, and the node list for node C will include nodes C1 and C2. A candidate set is one node from each of those node lists. The exhaustive "set of candidate sets" is simply all combinations of nodes from each node list. Using the example illustrated in FIG. 10, the set of candidate sets includes eight candidate sets, which are set forth below:

{A1, B1, C1}
{A1, B1, C2}
{A1, B2, C1}
{A1, B2, C2}
{A2, B1, C1}
{A2, B1, C2}
{A2, B2, C1}
{A2, B2, C2}

The result of application of the node combination process of FIG. 9B would be to eliminate from the above-noted set of candidate sets at least the following candidate sets, as the nodes in those candidate sets do not have the proper relationship as:

{A1, B1, C1}
{A1, B2, C1}
{A2, B1, C1}
{A2, B1, C2}
{A2, B2, C1}
{A2, B2, C2}

A unique aspect of the embodiments described herein is the fact that the "context-only" nodes, as well as the "key component" nodes, must be verified. Another unique aspect is the recognition that "context-only" nodes must be part of the key to distinguish between keys in the index. In other words, it is not sufficient to distinguish keys based solely on the uniqueness of the key components (components that are identified as the primary, secondary, tertiary, etc.). Two keys may be identical in all of their key components, but come from different contexts in the same document; therefore, the key format is such that context-only components form part of the key. This is vital for correct identification of which Before Keys and After Keys cancel each other out.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method of efficiently managing indexes for an XML document stored in an XML database, the method comprising:
    providing a first XML index definition document ("XIDD") for defining a first index for the XML document, the first XIDD comprising an in-memory tree structure for identifying elements and attributes to be indexed, including a context of the elements and attributes with respect to one another, wherein the first X1DD is applied to the XML document to create a first set of index keys for the XML document stored in the XML database;
    responsive to a change to the XML document affecting an update node thereof, performing a limited, localized traversal of the XML document around the update node to determine whether the change affects the first set of index keys; and
updating the first set of index keys as necessitated by the change;
the method further comprising:
    providing at least one additional X1DD for defining at least one additional index for the XML document, each additional XIDD comprising an in-memory tree structure for identifying elements and attributes to be indexed, including a context of the elements and attributes with respect to one another, wherein the at least one additional XIDD is applied to the XML document to create at least one additional set of index keys for the XML document stored in the XML database; and
    providing a master table comprising, for each node in each of the XIDDs, an entry that points to the X1DD node, wherein one of the entries of the master table points to at least one node of the first XIDD and to at least one node of the additional XIDD.

2. The method of claim 1 further comprising providing a master table that includes, for each node in the XIDD, an entry that points to the XIDD node.

3. The method of claim 1 wherein the performing a limited localized traversal of the XML document comprises:
   determining whether the XIDD includes a node corresponding to the update node; and
   responsive to a determination that the XIDD includes a node corresponding to the update node, determining whether the update node is hierarchically related to other nodes of the XML document as defined by the XIDD.

4. The method of claim 3 wherein the updating the first set of index keys as necessitated by the change further comprises:
   determining a before set of index keys for the XML document;
   determining an after set of index keys for the XML document;
   deleting from the first set of index keys the before set of index keys and adding to the first set of index keys the after set of index keys.

5. The method of claim 4 further comprising, prior to the deleting and adding, eliminating keys that are included in both the before and the after sets of index keys from the before set of index keys and the after set of index.

6. The method of claim 1 wherein the change to the XML document comprises an operation selected from a group consisting of updating a value of the update node, deleting the update node, or inserting the update node.

7. A system for efficient management of indexes for XML documents comprising:
   an XML database comprising a storage device for storing an XML document;
   a database engine for performing operations on and in connection with data stored in the XML database;
   a first XML index definition document ("XIDD") for defining a first index for the XML document, the first XIDD comprising an in-memory tree structure for identifying elements and attributes to be indexed, including a context of the elements and attributes with respect to one another; and
   a first set of index keys for the XML document stored in the XML database, the first set of index keys corresponding to the first XIDD;
   wherein responsive to a change to the XML document affecting an update node thereof, a limited, localized traversal of the XML document is performed to determine whether the change affects the first set of index keys and to update the first set of index keys as necessitated by the change;
   the system further comprising:
      at least one additional XIDD for defining at least one additional index for the XML document, the additional XIDD comprising an in-memory tree structure for identifying elements and attributes to be indexed, including a context of the elements and attributes with respect to one another;
      at least one additional set of index keys for the XML document stored in the XML database corresponding to the at least one additional XIDD; and
      a master table comprising, for each node in each of the XIDDs, an entry that points to the XIDD node, wherein one of the entries of the master table points to at least one node of the first XIDD and to at least one node of the additional XIDD.

8. The system of claim 7 further comprising a master table comprising, for each node in the XIDD, an entry that points to the XIDD node.

9. The system of claim 7 wherein the XIDD defines at least one node of the XML document as a key component node.

10. The system of claim 9 wherein the XIDD defines at least one node of the XML document as a context-only node, wherein the context-only node defines a context for the key component node within the XML document.

11. The system of claim 7 wherein the XIDD defines at least one relationship among nodes in the XML document.

12. The system of claim 7 wherein the change to the XML document comprises an operation selected from a group consisting of updating a value of the update node, deleting the update node, or inserting the update node.

13. A system of efficiently managing indexes for XML documents comprising:
   a storage device for storing an XML document;
   a first XML index definition document ("XIDD") for defining a first index for the XML document, the first XIDD comprising an in-memory tree structure for identifying elements and attributes to be indexed, including a context of the elements and attributes with respect to one another, wherein the first XIDD is applied to the XML document to create a first set of index keys for the XML document stored in the storage device;
   a module responsive to a change to the XML document affecting an update node thereof for performing a limited, localized traversal of the XML document around the update node to determine whether the change affects the first set of index keys; and
   a module for updating the first set of index keys as necessitated by the change;
   the system further comprising:
      at least one additional XIDD for defining at least one additional index for the XML document, the additional XIDD comprising an in-memory tree structure for identifying elements and attributes to be indexed, including a context of the elements and attributes with respect to one another;
      at least one additional set of index keys for the XML document stored in the XML database corresponding to the at least one additional XIDD; and
      a master table comprising, for each node in each of the XIDDs, an entry that points to the XIDD node, wherein one of the entries of the master table points to at least one node of the first XIDD and to at least one node of the additional XIDD.

14. The system of claim 13 further comprising a master table that includes, for each node in the XIDD, an entry that points to the XIDD node.

15. The system of claim 13 wherein performing a limited localized traversal of the XML document comprises:
   determining whether the XIDD includes a node corresponding to the update node; and
   responsive to a determination that the XIDD includes a node corresponding to the update node, determining whether the update node is hierarchically related to other nodes of the XML document as defined by the XIDD.

16. The system of claim 13 wherein updating the set of index keys as necessitated by the change further comprises:
   determining a before set of index keys for the XML document;
   determining an after set of index keys for the XML document; and deleting from the set of index keys the before set of index keys and adding to the set of index keys the after set of index keys.

17. The system of claim 16 wherein keys that are included in both the before and the after sets of index keys from the before set of index keys and the after set of index keys are eliminated prior to the deleting and adding.

\* \* \* \* \*